US006616549B2

(12) United States Patent
Dalton et al.

(10) Patent No.: US 6,616,549 B2
(45) Date of Patent: **\*Sep. 9, 2003**

(54) MULTI-LAYER HIGH SPIN GOLF BALL

(75) Inventors: Jeffrey L. Dalton, North Dartmouth, MA (US); Christopher Cavallaro, Lakeville, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/008,013

(22) Filed: Nov. 13, 2001

(65) Prior Publication Data

US 2002/0077196 A1 Jun. 20, 2002

Related U.S. Application Data

(63) Continuation-in-part of application No. 09/161,223, filed on Sep. 28, 1998, now Pat. No. 6,315,680, which is a continuation-in-part of application No. 08/996,718, filed on Dec. 23, 1997, now Pat. No. 6,124,389, and a continuation-in-part of application No. 08/706,008, filed on Aug. 30, 1996, now Pat. No. 5,813,923, and a continuation-in-part of application No. 08/603,057, filed on Feb. 16, 1996, now Pat. No. 5,759,676, and a continuation-in-part of application No. 08/606,373, filed on Feb. 23, 1996, now Pat. No. 5,721,304, and a continuation-in-part of application No. 08/746,362, filed on Nov. 8, 1996, now Pat. No. 5,810,678, which is a continuation-in-part of application No. 08/482,522, filed on Jun. 7, 1995, now Pat. No. 5,688,191.

(51) Int. Cl.$^7$ .......................... A63B 37/04; A63B 37/06
(52) U.S. Cl. ...................... 473/373; 473/365; 473/370; 473/374
(58) Field of Search ................... 473/373, 365, 473/374, 377, 371, 372; 264/255, 259; 525/419; 156/149

(56) References Cited

U.S. PATENT DOCUMENTS

| | | |
|---|---|---|
| 696,353 A | 3/1902 | Richards |
| 696,366 A | 3/1902 | Kempshall |
| 3,310,102 A | 3/1967 | Trombe ...................... 165/133 |
| 3,359,231 A | 12/1967 | Kent ........................ 524/493 |
| 3,490,146 A | 1/1970 | Guichet ....................... 433/69 |

(List continued on next page.)

FOREIGN PATENT DOCUMENTS

| | | |
|---|---|---|
| EP | 0 637 459 A1 | 2/1995 |
| GB | 2 260 546 A | 4/1993 |
| GB | 2 267 908 A | 12/1993 |
| GB | 2 278 609 A | 12/1994 |

*Primary Examiner*—Paul T. Sewell
*Assistant Examiner*—Tranh P Duong (57) ABSTRACT

A golf ball comprising a core of one or more layers, a cover layer of one or more layers and a mantle layer disposed between the core and the cover. The mantle layer comprises a thermoplastic material, preferably having a hardness of greater than 60 Shore D and a Bashore resilience of greater than 34 and a vicat point of greater than 350° F.

13 Claims, 2 Drawing Sheets

U.S. PATENT DOCUMENTS

| | | | | |
|---|---|---|---|---|
| 4,090,716 A | | 5/1978 | Martin et al. | 473/384 X |
| 4,123,061 A | | 10/1978 | Dusbiber | 473/377 |
| 4,208,493 A | * | 6/1980 | Deleens et al. | 525/419 |
| 4,234,184 A | * | 11/1980 | Deleens et al. | 156/146 |
| 4,337,947 A | | 7/1982 | Saito et al. | 473/356 |
| 4,398,000 A | | 8/1983 | Kataoka et al. | 525/437 |
| 4,431,193 A | | 2/1984 | Nesbitt | 273/235 R |
| 4,625,964 A | | 12/1986 | Yamada | 273/62 |
| 4,650,193 A | | 3/1987 | Molitor et al. | 273/228 |
| 4,714,253 A | | 12/1987 | Nakahara et al. | 273/228 |
| 4,781,383 A | | 11/1988 | Kamada et al. | 273/228 |
| 4,848,770 A | * | 7/1989 | Shama | 473/373 |
| 4,863,167 A | | 9/1989 | Matsuki et al. | 273/62 |
| 4,884,814 A | | 12/1989 | Sullivan | 514/524 |
| 4,919,434 A | | 4/1990 | Saito | 273/235 R |
| 4,984,804 A | | 1/1991 | Yamada et al. | 473/372 |
| 4,986,545 A | | 1/1991 | Sullivan | 473/372 |
| 5,000,459 A | | 3/1991 | Isaac | 473/356 |
| 5,002,281 A | | 3/1991 | Nakahara et al. | 273/220 |
| 5,026,067 A | | 6/1991 | Gentiluomo | 273/220 |
| 5,068,151 A | | 11/1991 | Nakamura | 428/407 |
| 5,072,944 A | | 12/1991 | Nakahara et al. | 273/220 |
| 5,104,126 A | | 4/1992 | Gentiluomo | 273/238 |
| 5,120,791 A | | 6/1992 | Sullivan | 525/196 |
| 5,150,906 A | | 9/1992 | Molitor et al. | 273/220 |
| 5,159,035 A | | 10/1992 | Evani | 526/196 |
| 5,184,828 A | | 2/1993 | Kim et al. | 273/228 |
| 5,222,739 A | | 6/1993 | Horiuchi et al. | 473/356 |
| 5,252,652 A | * | 10/1993 | Egashira et al. | 473/372 |
| 5,253,871 A | | 10/1993 | Viollaz | 273/228 |
| 5,298,571 A | | 3/1994 | Statz et al. | 525/330 |
| 5,314,187 A | | 5/1994 | Proudfit | 273/235 R |
| 5,368,304 A | | 11/1994 | Sullivan et al. | 473/377 |
| 5,387,637 A | | 2/1995 | Sullivan | 473/377 X |
| 5,415,937 A | | 5/1995 | Cadorniga et al. | 428/407 |
| 5,439,227 A | | 8/1995 | Egashira et al. | 473/374 X |
| 5,467,994 A | | 11/1995 | Moriyama et al. | 273/222 |
| 5,484,870 A | * | 1/1996 | Wu | 528/28 |
| 5,492,972 A | | 2/1996 | Stefani | 525/196 |
| 5,553,852 A | | 9/1996 | Higuchi et al. | 473/373 |
| 5,556,098 A | | 9/1996 | Higuchi et al. | 473/373 |
| 5,580,057 A | | 12/1996 | Sullivan et al. | 273/22 |
| 5,601,502 A | | 2/1997 | Hiraoka et al. | 473/373 |
| 5,609,532 A | | 3/1997 | Chikaraishi | 473/365 |
| 5,681,898 A | | 10/1997 | Pocklington | 525/193 |
| 6,315,680 B1 | * | 11/2001 | Dalton et al. | 473/373 |
| 6,325,730 B1 | * | 12/2001 | Binette et al. | 473/377 |
| 6,361,730 B1 | * | 3/2002 | Alex et al. | 264/255 |

* cited by examiner

MULTI-LAYER HIGH SPIN GOLF BALL

This application is a continuation-in-part of U.S. patent application Ser. No. 09/161,223 filed Sep. 28, 1998 now U.S. Pat. No. 6,315,680, which is a continuation-in-part of U.S. patent application Ser. Nos. 08/996,718, now U.S. Pat. No. 6,124,389, 08/706,008 now U.S. Pat. No. 5,813,923, 08/603,057 now U.S. Pat. No. 5,759,676, 08/606,373 now U.S. Pat. No. 5,721,304, and 08/746,362 now U.S. Pat. No. 5,810,678, which were filed Dec. 23, 1997, Aug. 30, 1996, Feb. 16, 1996, Feb. 23, 1996, and Nov. 8, 1996, respectively, which are continuation-in-part applications of patent application Ser. No. 08/482,522, now U.S. Pat. No. 5,688,191, filed Jun. 7, 1995.

FIELD OF THE INVENTION

This invention relates generally to golf balls, and more specifically, to a multilayer golf ball. In particular, this invention relates to a golf ball having a core with one or more layers, at least one cover layer with a flexural modulus ranging from about 1,000 psi to about 200,000 psi and one or more mantle layers disposed between the core and cover layer. The multilayer golf balls of the present invention have been found to provide good distance and spin characteristics.

BACKGROUND OF THE INVENTION

Conventional golf balls can be divided into two general types or groups: two piece balls or wound balls (also know as three-piece balls). The difference in play characteristics resulting from these different types of constructions can be quite significant.

Balls having a two piece construction are generally most popular with the average recreational golfer because they provide a very durable ball while also providing maximum distance. Two piece balls are made with a single solid core, usually made of a crosslinked rubber, which is encased by a cover material. Typically the solid core is made of polybutadiene which is chemically crosslinked with zinc diacrylate and/or similar crosslinking agents and is covered by a tough, cut-proof blended cover. The cover is generally a material such as SURLYN®, which is a trademark for an ionomer resin produced by DuPont. The combination of the core and cover materials provide a "hard" ball that is virtually indestructible by golfers. Further, such a combination imparts a high initial velocity to the ball which results in improved distance. Because these materials are very rigid, two piece balls have a relatively low spin rate which makes them difficult to control, particularly on shorter approach shots. However, as golf ball manufacturers continue to improve the spin and feel characteristics of the two piece ball, it is likely that the two piece ball will continue to grow in popularity.

Consequently, a need exists for an improved ball which provides relative ease of manufacturing, durability and distance.

SUMMARY OF THE INVENTION

The present invention is directed towards a multi-layer golf ball which provides good spin characteristics, while also providing the distance, durability and relative ease of manufacturing.

The present invention is further directed towards a multi-layer golf ball which comprises a core with one or more layers; at least one cover layer; and one or more mantle layers disposed between the core and cover layer, wherein the mantle layer comprises dynamically vulcanized thermoplastic elastomer, functionalized styrene-butadiene elastomer, thermoplastic polyurethane, a thermoplastic polyetherester or polyetheramide, a thermoplastic ionomer resin, a thermoplastic polyester, another dynamically vulcanized elastomer, another a functionalized styrene-butadiene elastomer, another a metallocene polymer or blends thereof and/or thermoset materials.

In a preferred embodiment, the present invention is also directed towards a multi-layer golf ball which comprises a core; a cover layer comprising an inner layer and an outer layer, wherein the outer layer comprises a material with a lower melting point or heat of reaction temperature (also referred to as cure temperature) than that of the material of the inner layer; and at least one mantle layer disposed between the core and cover layer, wherein the mantle layer comprises dynamically vulcanized thermoplastic elastomer, functionalized styrene-butadiene elastomer, thermoplastic polyurethane or metallocene polymer and blends thereof.

The present invention is still further directed to a multi-layer golf ball which comprises a core, at least one cover layer and at least one mantle layer disposed between the core and cover layer wherein properties such as the thickness, hardness, flexural modulus, tensile modulus or Bashore resilience of the various layers is such as to provide a ball with optimum performance characteristics.

DESCRIPTION OF THE PREFERRED EMBODIMENTS

Figure 1:
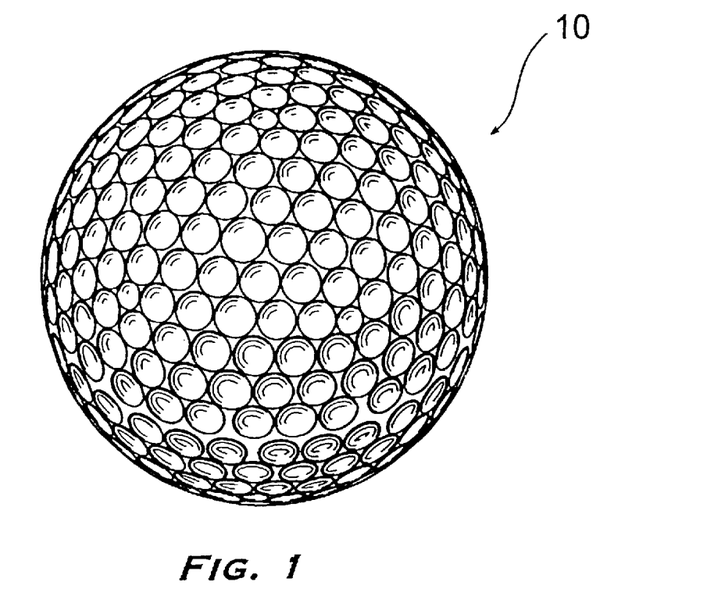
FIG. 1 is a perspective view of a golf ball according to the present invention.
Figure 2:
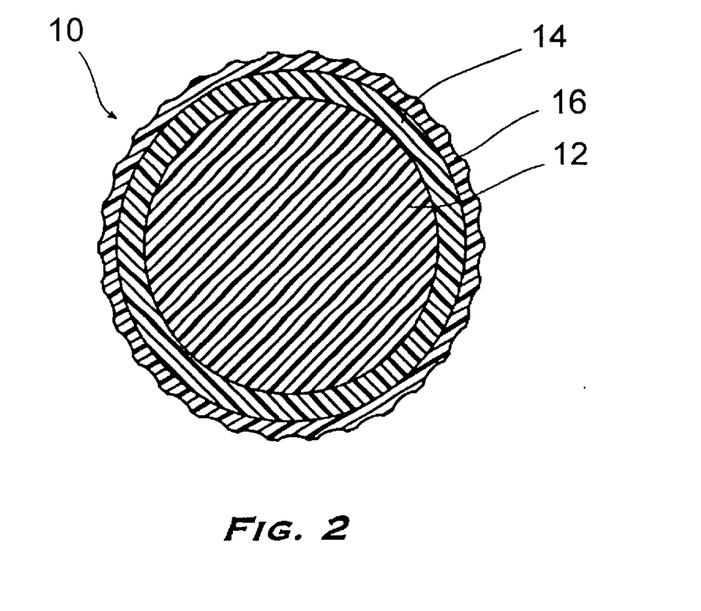
FIG. 2 is a cross-sectional view of a golf ball according to the present invention.
Figure 3:
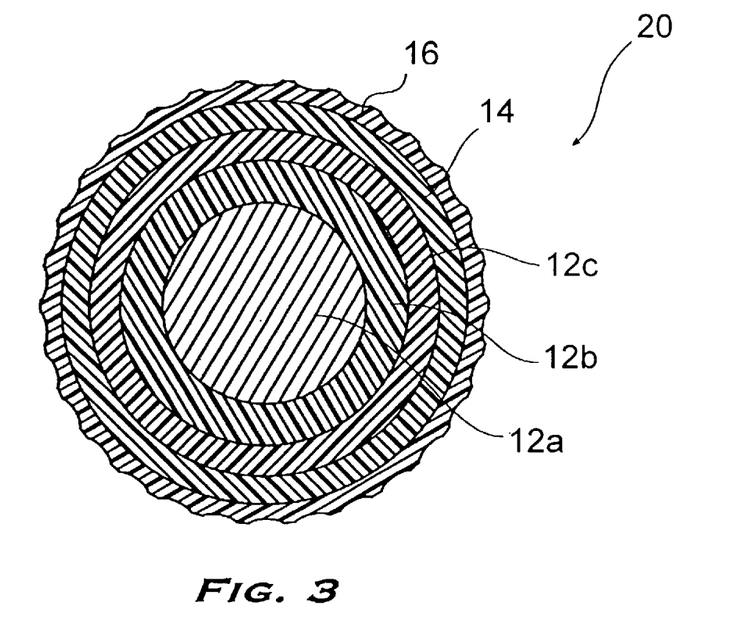
FIG. 3 is a cross-sectional view of a second golf ball according to the present invention.
Figure 4:
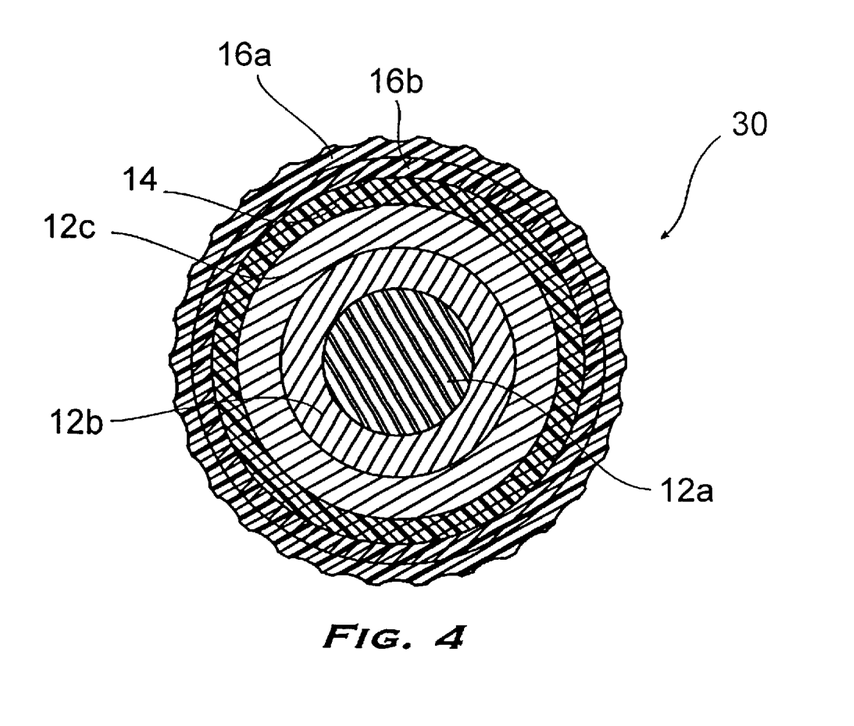
FIG. 4 is a cross-sectional view of a third golf ball according to the present invention.

Referring to FIGS. 1 and 2, this invention is particularly directed towards a multi-layer golf ball 10 which comprises a core 12, at least one cover layer 16 and at least one mantle layer 14 disposed therebetween, wherein the mantle layer comprises dynamically vulcanized thermoplastic elastomer, functionalized styrene-butadiene elastomer, thermoplastic polyurethane or metallocene polymer or blends thereof. In FIG. 3, the invention is directed to a ball 20, comprised of a core having layers 12a, 12b and/or 12c, mantle layer 14 and cover 16. In FIG. 4, the present invention is directed to a golf ball 30 comprised of a core having layers 12a, 12b and/or 12c, mantle layer 14 and cover layers 16a and 16b. These aspects of the invention are discussed in more detail below.

Suitable dynamically vulcanized thermoplastic elastomers include Santoprene®, Sarlink®, Vyram®, Dytron® and Vistaflex®. Santoprene® is the trademark for a dynamically vulcanized PP/EPDM. Santoprene® 203-40 is an example of a preferred Santoprene® and is commercially available from Advanced Elastomer Systems. Examples of suitable functionalized styrene-butadiene elastomers include Kraton FG-1901x and FG-1921x, which is available from the Shell Corporation. Examples of suitable thermoplastic polyurethanes include Estane® 58133, Estane® 58134 and Estane® 58144, which are commercially available from the B.F. Goodrich Company. Suitable metallocene polymers whose melting points are higher than the cover materials can also be employed in the mantle layer of the present invention. Further, the materials for the mantle layer described above may be in the form of a foamed polymeric material. For example, suitable metallocene polymers include foams of thermoplastic elastomers based on metallocene single-site catalyst-based foams. Such metallocene-based foam resins are commercially available from Sentinel Products of Hyannis, Mass.

The mantle layer may comprise up to 100% by weight of a dynamically vulcanized thermoplastic elastomer, a functionalized styrene-butadiene elastomer, a thermoplastic polyurethane, a metallocene polymer or blends thereof. In a preferred embodiment of the present invention, the mantle layer comprises Santoprene®, thermoplastic polyurethane or blends thereof.

However, in another preferred embodiment of the present invention, the mantle layer comprises a dynamically vulcanized thermoplastic elastomer, a functionalized styrene-butadiene elastomer, a thermoplastic polyurethane or a metallocene polymer, a thermoplastic polyurethane, a thermoplastic polyetherester or polyetheramide, a thermoplastic ionomer resin, a thermoplastic polyester, another dynamically vulcanized elastomer, another a functionalized styrene-butadiene elastomer, another a metallocene polymer or blends thereof.

Suitable thermoplastic polyetheresters include Hytrel® 3078, Hytrel® 3548, Hytrel® 4078, Hytrel® 4069, Hytrel® 6356, Hytrel® 7246, and Hytrel® 8238 which are commercially available from DuPont. Suitable thermoplastic polyetheramides include Pebax® 2533, Pebax® 3533, Pebax® 4033, Pebax® 5533, Pebax® 6333, and Pebax® 7033 which are available from Elf-Atochem. Suitable thermoplastic ionomer resins include any number of olefinic based ionomers including SURLYN® and Iotek®, which are commercially available from DuPont and Exxon, respectively. The flexural moduli for these ionomers is about 1000 psi to about 200,000 psi. Suitable thermoplastic polyesters include polybutylene terephthalate. Likewise, the dynamically vulcanized thermoplastic elastomers, functionalized styrene-butadiene elastomers, thermoplastic polyurethane or metallocene polymers identified above are also useful as the second thermoplastic in such blends. Further, the materials of the second thermoplastic described above may be in the form of a foamed polymeric material.

Such thermoplastic blends comprise about 1% to about 99% by weight of a first thermoplastic and about 99% to about 1% by weight of a second thermoplastic. Preferably the thermoplastic blend comprises about 5% to about 95% by weight of a first thermoplastic and about 5% to about 95% by weight of a second thermoplastic. In a preferred embodiment of the present invention, the first thermoplastic material of the blend is a thermoplastic polyetherester, such as Hytrel®.

The present invention also contemplates the use of a variety of non-conventional cover materials. In particular, the covers of the present invention may comprise thermoplastic or engineering plastics such as ethylene or propylene based homopolymers and copolymers including functional monomers such as acrylic and methacrylic acid and fully or partially neutralized ionomers and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), reinforced engineering plastics, acrylonitrile-butadiene, acrylic-styrene-acrylonitrile, poly(ethylene terephthalate), poly(butylene terephthalate), poly(ethylene-vinyl alcohol), poly(tetrafluoroethylene) and their copolymers including functional comonomers and blends thereof. These polymers or copolymers can be further reinforced by blending with a wide range of fillers and glass fibers or spheres or wood pulp.

The core of the present invention may comprise a variety of materials, including those conventionally employed as golf ball cores. The conventional materials for such cores include core compositions having a base rubber, a crosslinking agent, a filler and a co-crosslinking agent. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene. The initiator included in the core composition can be any known polymerization initiator which decomposes during the cure cycle. The crosslinking agent includes a metal salt of an unsaturated fatty acid such as a zinc salt or a magnesium salt of an unsaturated fatty acid having 3 to 8 carbon atoms such as acrylic or methacrylic acid. The filler typically includes materials such as tungsten, zinc oxide, barium sulfate, silica, calcium carbonate, zinc carbonate and the like.

In one embodiment of the present invention, the core comprises a center which is liquid-filled or solid around which an elastic thread is wound. The solid center is typically a homogenous mass of a resilient material such as polybutadiene or a natural rubber. The liquid-filled center is typically a thin walled sphere into which a liquid such as corn syrup is injected by means of a hypodermic needle. The sphere is then sealed and frozen to make the center a solid mass. The windings for either type of center are provided by an elastic thread which is stretched and wound about the center to a desired thickness.

In a second embodiment of the present invention, the core is solid and has a diameter of at least about 1.50 inches. Preferably, the core has one or more layers and one of the layers comprises a polybutadiene rubber composition comprising a halogenated organosulfur compound. The cover has a thickness of less than about 0.1 inches and preferably comprises a polyurethane composition. The core can include a center and an outer core layer and the core preferably has a diameter of at least about 1.55 inches. The center can comprise the organosulfur compound to reduce the overall core and ball compression as set forth below. Such cores are disclosed in co-pending U.S. application Ser. No. 09/951, 963, which is incorporated by reference herein in its entirety.

The polybutadiene rubber composition preferably includes between about 2.2 parts and about 5 parts of a halogenated organosulfur compound. The halogenated organosulfur compound may include pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol;

2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts, the metal salts thereof, and mixtures thereof, but is preferably pentachlorothiophenol or the metal salt thereof. The metal salt may be zinc, calcium, potassium, magnesium, sodium, and lithium, but is preferably zinc.

In one embodiment, the core has a compression less than about 75 and the golf ball has a coefficient of restitution of greater than about 0.800. In another, the core has a compression less than about 75 and the golf ball has a coefficient of restitution of greater than about 0.805. In still another, the core has a compression less than about 55 and the golf ball has a coefficient of restitution of greater than about 0.800.

The cover layer of the present invention comprises at least one layer of a thermoplastic or thermosetting material. Any number of a wide variety of cover materials maybe be used in the present invention. Among the preferred conventional cover materials are ionomer resins obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component of the subject invention includes E/X/Y copolymers where E is ethylene, X is a softening comonomer such as acrylate or methacrylate present in 0–50 (preferably 0–25, most preferably 0–2), weight percent of the polymer, and Y is acrylic or methacrylic acid present in 5–35 (preferably 8–35, most preferably 8–30) weight percent of the polymer, wherein the acid moiety is neutralized 1–100% (preferably at least 40%, most preferably at least about 80%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth) acrylic acid/n-butyl acrylate, ethylene/(meth)acrylic acid/ethyl acrylate, and ethylene/(meth) acrylic acid/methyl acrylate copolymers. The manner in which the ionomers are made is well known in the art as described in e.g. U.S. Pat. No. 3,262,272. Such ionomer resins are commercially available from DuPont Co. under the tradename SURLYN®.

Likewise, other conventional materials such as balata, elastomer and polyethylene may also be used in the cover layers of the present invention. Additionally, foamed polymeric materials are suitable for use in the cover layers of the present invention. In particular, metallocene-based foam resins are useful in the cover layers of the present invention.

In a preferred embodiment of the present invention, the cover layer comprises an inner layer and an outer layer. The inner layer of the cover is either a thermoplastic material such as a thermoplastic elastomer or a thermoplastic rubber.

Some examples of materials suitable for use as the outer cover layer include polyether or polyester thermoplastic urethanes as well as thermoset polyurethanes. A preferable thermoplastic material is a thermoplastic urethane with a melting point of about 178° to about 205° C. A preferable thermoset material is a elastomer based, castable urethane. Suitable materials for the outer layer include Urethanes, ionomers with a low modulus and other durable materials such as EPDM and butyl rubber. If the outer cover layer includes polyurethane, it includes a prepolymer formed of a polyisocyanate and a polyol, and a curing agent. Preferably, at least one of the prepolymer and curing agent are saturated. In an alternative embodiment, the polyurethane composition comprises at least one of a UV absorber, a hindered amine light stabilizer, or an optical brightener. Additionally, the present invention also contemplates the use of a polymeric foam material, such as the metallocene-based foamed resin described above, as the material for either the outer cover layer or the inner cover layer, but preferably not both layers.

In one embodiment of the present invention, it is preferable that the thermoplastic or thermosetting materials of the outer layer have a melting point or heat of reaction (cure) temperature less than the melting point or heat of reaction (cure) temperature of the materials of the inner layer or mantle layer.

The inner and outer cover layers of this embodiment of the invention can be molded about the core and mantle layers through a variety of conventional molding methods. For example, the cover layers can be compression molded, retractable pin injection molded, fixed pin injection molded, reaction-injection molded, cast around the core and mantle or a combination thereof. However, it is important that the materials of the outer layer are characterized in that they have thermal properties such that no flow of the inner layer or mantle layer material occurs during the molding of the outer cover layer regardless of the process employed to mold the layers.

The inner cover layer of this embodiment of the present invention has a thickness of about 0.005 inches to about 0.060 inches. The outer cover layer has a thickness of about 0.010 inches to about 0.100 inches. In one embodiment, preferably, the inner cover layer has a thickness of about 0.010 inches to about 0.050 inches and the outer cover layer has a thickness of about 0.030 inches to about 0.090 inches. In another embodiment, the outer cover layer is thinner than the inner cover layer and softer than the inner cover layer and has a thickness of between 0.005 and 0.035.

The properties such as hardness, Bashore resilience, modulus, core diameter and mantle layer thickness of the golf balls of the present invention have been found to effect play characteristics such as spin, initial velocity and feel of the present golf balls.

In particular, the thickness of the mantle layer of the present invention is about 0.02 inches to about 0.125 inches. Preferably, the thickness of the mantle layer is about 0.02 inches to about 0.10 inches. Most preferably, the thickness of the mantle layer is about 0.03 inches to about 0.05 inches. Similarly, the diameter of the core of the present invention is about 1.25 inches to about 1.60 inches, more preferably between about 1.30 inches and about 1.57 inches. Most preferably the diameter of the core is about 1.50 inches to about 1.58 inches. The overall diameter of the core and mantle layer is about 84% to about 97% of the overall diameter of the finished ball. The present multi-layer golf ball can have an overall diameter of any size. Although the United States Golf Association (USGA) specifications limit the minimum size of a competition golf ball to more than 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches. However, oversized game balls well in excess of 1.800 inches are also contemplated by the present invention.

Several physical properties such as hardness, resilience and modulus of the various layers of the golf balls of the present invention are believed to impact the playing characteristics of such golf balls. Accordingly, it is preferable that the golf balls of one embodiment of the present invention have a mantle layer with a flexural modulus of about 500 psi to about 15,000 psi. Likewise, it is preferred that the mantle layer have a tensile modulus of about 500 psi to about 15,000 psi. In another embodiment having a cover layer with a flexual modulus of less than 20,000 psi, the mantle layer has a flexural modulus of greater than 45,000 psi.

Further, the core of the present invention has a Bashore resilience of about 30 to about 80. The mantle layer of the present invention has a Bashore resilience of about 35 to about 80. Preferably the mantle layer has a Bashore resilience of about 40 to about 80.

The golf balls of one embodiment to the present invention have a mantle layer with a Shore D hardness of less than about 60 to provide low spin. Preferably, the Shore D hardness of the mantle layer is about 20 to about 60. The core has a Shore D hardness of about 30 to about 65. Preferably, the core has a Shore D hardness of about 35 to about 60.

In another preferred embodiment, the mantle layer has a Shore D hardness greater than 60 and preferably comprises thermoplastic copolyetherester block copolymer, thermoplastic copolyesterester block copolymer, thermoplastic polyurethane, thermoset polyurethane, dynamically vulcanized thermoplastic elastormer, styrene-isoprene and styrene-isoprene elastomer with a functional group such as maleic anhydride or sulfonic acid, polymer made using a metallocene catalyst, or blends thereof and/or thermoset materials.

The golf balls of the present invention can be made by any conventional process employed in the golf ball art. For example, the solid cores can be either injection or compression molded. Similarly, the undersized wound cores of the present invention are produced through conventional means. The mantle layer is subsequently injection or compression molded about the core. It is important that the mantle material be able to sustain the temperatures applied during the application of the cover layer. As discussed below, the mantle preferably has a high vicat point. The cover layer or layers are then injection or compression molded or cast about the mantle layer.

Illustrated in Table I are a number of batch formulations for several mantle layer compositions of the present invention, as well as properties such a hardness (Shore D), Bashore resilience, flexural modulus, % strain at break and tensile modulus for each composition.

The following examples of batch compositions are given to illustrate the novel multi-layer golf balls of the present invention. However, it is to be understood that the examples are only for illustrative purposes and in no manner is the present invention limited to the specific disclosures therein.

TABLE 1

Mantle Layer Compositions and Properties

| Sample | Hardness (Shore D) | Resilience | Flex Modulus (psi) | Tensile Modulus (psi) | % Strain at Break |
|---|---|---|---|---|---|
| 1A 0% Estane 58091 100% Estane 58861 | 28 | 54 | 1,720 | 756 | 563 |
| 1B 25% Estane 58091 75% Estane 58861 | 34 | 41 | 2,610 | 2,438 | 626 |
| 1C 50% Estane 58091 50% Estane 58861 | 44 | 31 | 10,360 | 10,824 | 339 |
| 1D 75% Estane 58091 25% Estane 58861 | 61 | 34 | 43,030 | 69,918 | 149 |
| 1E 100% Estane 58091 0% Estane 58861 | 78 | 46 | 147,240 | 211,288 | 10 |
| 2A 0% Hytrel 5556 100% Hytrel 4078 | 40 | 47 | 8,500 | 7,071 | 527 |
| 2B 25% Hytrel 5556 75% Hytrel 4078 | 43 | 51 | 10,020 | 9,726 | 441 |
| 2C 50% Hytrel 5556 50% Hytrel 4078 | 45 | 47 | 12,280 | 10,741 | 399 |
| 2D 75% Hytrel 5556 25% Hytrel 4078 | 48 | 53 | 13,680 | 13,164 | 374 |
| 3A 0% Hytrel 5556 100% Hytrel 3078 | 30 | 62 | 3,240 | 2,078 | 810 no break |
| 3B 25% Hytrel 5556 75% Hytrel 3078 | 37 | 59 | 8,170 | 5,122 | 685 |

TABLE 1-continued

Mantle Layer Compositions and Properties

| Sample | Hardness (Shore D) | Resilience | Flex Modulus (psi) | Tensile Modulus (psi) | % Strain at Break |
|---|---|---|---|---|---|
| 3C 50% Hytrel 5556 50% Hytrel 3078 | 44 | 55 | 15,320 | 10,879 | 590 |
| 3D 75% Hytrel 5556 25% Hytrel 3078 | 53 | 50 | 19,870 | 16,612 | 580 |
| 3E 100% Hytrel 5556 0% Hytrel 3078 | 58 | 50 | 24,840 | 17,531 | 575 |
| 4A 0% Hytrel 4078 100% Pebax 4033 | 46 | 51 | 11,150 | 8,061 | 597 |
| 4B 25% Hytrel 4078 75% Pebax 4033 | 46 | 53 | 10,630 | 7,769 | 644 |
| 4C 50% Hytrel 4078 50% Pebax | 45 | 52 | 9,780 | 8,117 | 564 |
| 4D 75% Hytrel 4078 25% Pebax 4033 | 42 | 53 | 9,310 | 7,996 | 660 |
| 4E 100% Hytrel 4078 0% Pebax 4033 | 40 | 51 | 9,250 | 6,383 | 531 |
| 5A 0% Hytrel 3078 100 Estane 5809 | 77 | 50 | 156,070 | 182,869 | 9 |
| 5B 25% Hytrel 3078 75% Estane 5809 | 65 | 48 | 87,680 | 96,543 | 33 |
| 5C 50% Hytrel 3078 50% Estane 5809 | 52 | 49 | 53,940 | 48,941 | 102 |
| 5D 75% Hytrel 3078 25% Estane 5809 | 35 | 54 | 12,040 | 6,071 | 852 |
| 5E 100% Hytrel 3078 0% Estane 5809 | 29 | 50 | 3,240 | 2,078 | 810 no break |
| 6A 100% Kraton 1921 0% Estane 58091 0% Surlyn 7940 | 29 | 59 | 24,300 | 29,331 | 515 |
| 6B 50% Kraton 1921 50% Estane 58091 0% Surlyn 7940 | 57 | 49 | 56,580 | — | 145 |
| 6C 50% Kraton 1921 0% Estane 58091 50% Surlyn 7940 | 56 | 55 | 28,290 | 28,760 | 295 |
| 7A 33.3% Pebax 4033 33.3% Estane 58094 33.3% Hytrel 3078 | 48 | 50 | 41,240 | 30,032 | 294 |
| 7B 30% Pebax 4033 40% Estane 58091 10% Hytrel 3078 | 48 | 50 | 30,650 | 14,220 | 566 |
| 7C 20% Pebax 4033 40% Estane 58091 40% Hytrel 3078 | 41 | 54 | 24,020 | 16,630 | 512 |

Tables II and III provide test data for one embodiment of the present invention. In particular, the spin rate and velocity were measured for a golf ball of the present invention wherein the mantle layer was 100% Estane 58881 and Hytrel 4078, the cover was a conventional Li/Na SURLYN® blend and the core was a conventional cross-linked polybutadiene core. Also tested were conventional two piece golf balls (a Titleist HVC 90 and Pinnacle Gold). Each ball was tested in a True Temper Test Machine. The test machine was configured to strike the balls with a Driver and an Eight Iron.

TABLE II

Spin Rate Test Results for Driver

| Sample | Launch | Std. | Spin (rpm) | Std. | Velocity (ft/sec) | Std. |
|---|---|---|---|---|---|---|
| Titleist HVC (Control) | 9.3° | 0.4 | 3038 | 287 | 159.8 | 1.6 |
| Pinnacle Gold (Control) | 9.3° | 0.4 | 3027 | 303 | 158.9 | 1.5 |
| Estane Mantle w/ 1.30" polybutadiene core and Li/Na SURLYN cover | 8.8° | 0.6 | 3677 | 188 | 156.50 | 0.9 |
| Hytrel Mantle w/1.30" polybutadiene core and Li/Na SURLYN cover | 8.7° | 0.7 | 3479 | 259 | 155.9 | 2.0 |

TABLE III

Spin Rate Test Results for 8-Iron

| Sample | Launch | Std. | Spin (rpm) | Std. | Velocity (ft/sec) | Std. |
|---|---|---|---|---|---|---|
| Titleist HVC (Control) | 19.5° | 0.3 | 7690 | 175 | 113.0 | 0.8 |
| Pinnacle Gold (Control) | 19.8° | 0.4 | 7549 | 209 | 112.5 | 1.0 |
| Estane Mantle w/ 1.30" polybutadiene core and Li/Na SURLYN cover | 18.7° | 0.5 | 8115 | 257 | 110.7 | 1.1 |
| Hytrel Mantle w/1.30" polybutadiene core and Li/Na SURLYN cover | 18.5° | 0.4 | 7913 | 256 | 110.6 | 1.1 |

In another preferred embodiment of the present invention, the mantle layer 14 is a thermoplastic copolyetherester block copolymer. Suitable thermoplastic copolyetheresters include Hytrel® 6356, Hytrel® 7246 Hytrel® 8238 which are commercially available from DuPont. Hytrel® 6356 being the most preferred.

| Material | Flex modulus (psi) | Hardness (shore D) | Vicat Point (F) |
|---|---|---|---|
| Low acid ionomers (15% or less) | | | |
| 8940 | 51,000 | 65 | 145 |
| 7940 | 61,000 | 68 | 145 |
| 9910 | 48,000 | 64 | 144 |
| High acid ionomers | | | |
| 8140 | 75,000 | 65 | 136 |
| Hytrel | | | |
| 6356 | 48,000 | 63 | 412 |
| 7246 | 83,000 | 72 | 424 |
| 8238 | 174,000 | 82 | 433 |

The mantle layer according to the present invention preferably has a specific gravity greater than about 1.2. In one embodiment, the specific gravity of the mantle layer is increased to about 1.25 by adding abut 20% of a filler such as barium sulfate, zinc oxide, titanium dioxide and combinations thereof. The most preferred golf ball is comprised of a mantle layer make of Hytrel® 6356 and 20% zinc oxide or 10% Tungsten. As shown above, the thermoplastic copolytheresters have a very high vicat softening temperature. This aids in manufacturing and particularly when a thermoset polyurethane cover is cast or reaction-injection-molded directly over the mantle layer. Preferably, the mantle layer is comprised of a material having a Vicat point greater than about 250° F. More preferably, the mantle layer material has a Vicat point greater than about 350° F.

Suitable dynamically vulcanized thermoplastic elastomers include Santoprene®, Sarlink®, Vyram®, Dytron® and Vistaflex®. Santoprene® is the trademark for a dynamically vulcanized PP/EPDM. Santoprene® 203-40 is an example of a preferred Santoprene® and is commercially available from Advanced Elastomer Systems. An example of suitable functionalized styrene-butadiene elastomer, i.e., styrene-butadiene elastomers with functional groups such as maleic anhydride or sulfonic acid, is Kraton G7680 which is available from the Shell Corporation. Examples of suitable thermoplastic polyurethanes include Estane® 58861 and Estane® 58091, which are commercially available from the B.F. Goodrich Company. Suitable metallocene polymers, i.e., polymers made with a metallocene catalyst, whose melting points are higher than the cover materials can be employed in the mantle layer of the present invention. Further, the materials for the mantle layer described above may be in the form of a foamed polymeric material. For example, suitable metallocene polymers include foams of thermoplastic elastomers based on metalocene single catalyst-based foams. Such metallocene-based foam resins are commercially available from Sentinel Products of Hyannis Mass.

EXAMPLES

These and other aspects of the present invention may be more fully understood with reference to the following non-limiting examples, which are merely illustrative of the preferred embodiment of the present invention golf ball, and are not to be construed as limiting the invention, the scope of which is defined by the appended claims.

The first example is a ball with a core diameter of about 1.45. The core has a high specific gravity. Preferably, the core has a specific gravity of greater than 1.21 and most preferably about 1.23. The mantle layer covering the core has a thickness of about 0.05 to 0.1 inches, preferably about 0.06–0.08 inches. The mantle layer preferably has a specific gravity of 0.91 and is made of Kraton G7890 or Hytrel 6356 or 7246. The cover of the ball has a thickness of about 0.02 to 0.05 and most preferably about 0.045 inches. The cover preferably has a specific gravity of about 0.95 to 1.1 and is made of SURLYN® or a MDI cast polyurethane as set forth below. The golf ball preferably weights about 1.618 ounces.

The second example of a golf ball made according to the present invention has a core with a low specific gravity and a mantle layer with a high specific gravity. Preferably, mantle layer has a specific gravity of greater than 1.21, most preferably the mantle layer has a specific gravity of about 1.25. In the preferred embodiment, the mantle layer is made of Hytrel 6356. The mantle layer has a thickness of about 0.02 to about 0.05 inches, and most preferably about 0.03 inches. The cover is preferably a cast polyurethane having a flexural modulus of less than 20,000 psi.

The core of the second example preferably has a specific gravity of less than 1.21 and most preferably a specific gravity of about 1.13. The diameter of the core is preferably 1.4 to 1.6 inches and most preferably about 1.55 inches. The cover layer surrounding both the core and mantle layer has a thickness of about 0.02 to about 0.05 inches and most preferably about 0.03 inches. Further, the specific gravity of the cover is most preferably about 0.95 to about 1.1.

While the cover may be formed of any of the above-listed materials, the outer cover preferably includes a polyurethane, polyurea, or epoxy composition, generally comprising the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("$H_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, and more preferably, less than about 7.0%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups.

Polyamine curatives are also suitable for use in polyurethane covers. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as Ethacure® 300, commercially available from Albermarle Corporation of Baton Rouge, La. Suitable polyamine curatives include both primary and secondary amines.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl)ether; and mixtures thereof. Preferred hydroxy-terminated curatives include 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol, and mixtures thereof.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a particularly preferred embodiment of the present invention, saturated polyurethanes used to form cover layers, preferably the outer cover layer, and may be selected from among both castable thermoset and thermoplastic polyurethanes. In this embodiment, the saturated polyurethanes are substantially free of aromatic groups or moieties.

Saturated diisocyanates which can be used include, but are not limited to, ethylene diisocyanate; propylene-1,2-diisocyanate; tetramethylene-1,4-diisocyanate; 1,6-hexamethylene-diisocyanate ("HDI"); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate ("HMDI") and isophorone diisocyanate ("IPDI").

Saturated polyols which are appropriate for use in this invention include, but are not limited to, polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol initiated polycaprolactone, 1,4-butanediol initiated polycaprolactone, 1,6-hexanediol initiated polycaprolactone; trimethylol propane initiated polycaprolactone, neopentyl glycol initiated polycaprolactone, PTMEG-initiated polycaprolactone. The most preferred saturated polyols are PTMEG and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine, ethylene diamine, diethylene triamine, triethylene tetramine, tetraethylene pentamine, 4,4'-dicyclohexylmethane diamine, 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino)cyclohexane; isophorone diamine, hexamethylene diamine, propylene diamine, 1-methyl-2,4-cyclohexyl diamine, 1-methyl-2,6-cyclohexyl diamine, 1,3-diaminopropane, dimethylamino propylamine, diethylamino propylamine, imido-bis-propylamine, isomers and mixtures of isomers of diaminocyclohexane, monoethanolamine, diethanolamine, triethanolamine, monoisopropanolamine, and diisopropanolamine. The most preferred saturated curatives are 1,4-butanediol, 1,4-cyclohexyldimethylol and 4,4'-bis-(sec-butylamino)-dicyclohexylmethane.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

As used herein, the term "about," used in connection with one or more numbers or numerical ranges, should be understood to refer to all such numbers, including all numbers in a range.

The invention described and claimed herein is not to be limited in scope by the specific embodiments herein disclosed, since these embodiments are intended al illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:
   (a) a core of two or more layers;
   (b) a cover layer of one or more layers; and
   (c) a mantle layer disposed between the core and the cover;
   wherein the mantle layer comprises a non-ionomeric, thermoplastic material, having a hardness of less than 60 Shore D and a resilience of greater than 34.

2. The golf ball of claim 1, wherein the thickness of the mantle layer is from about 0.025 inches to about 0.125 inches.

3. The golf ball of claim 1, wherein the core is comprised of an inner core layer and outer core layer and the inner core layer is comprised of a polybutadene rubber and organo-sulfer compound.

4. The golf ball of claim 3, wherein the diameter of the core is about 1.40 inches to about 1.570 inches.

5. The golf ball of claim 1, wherein the mantle has a flex modulus of about 500 psi to about 50,000 psi.

6. The golf ball of claim 1, wherein the mantle has a tensile modulus of about 500 psi to about 50,000 psi.

7. The golf ball of claim 1, wherein the overall diameter of the finished ball is about 1.68 inches to about 1.80 inches.

8. A golf ball comprising:
   core of one or more layers having a compression of about 30 to 90;
   cover of one or more layers;
   mantle layer disposed between the core and the cover and having a vicat point of greater than about 350° F. and wherein the mantle layer has a thickness of less than about 0.1 inch.

9. The golf ball of claim 8, wherein the cover is comprised of a polyurethane or polyurea based material.

10. The golf ball of claim 8, wherein the core is comprised of an inner core layer and an outer core layer.

11. The golf ball of claim 8, wherein the mantle has a Shore D hardness of at least about 60.

12. The golf ball of claim 8, wherein the mantle layer is a non-ionomeric, thermoplastic elastomer.

13. The golf ball of claim 8, wherein the mantle layer has a flexural modulus of at least about 45,000 psi.

* * * * *